United States Patent [19]

McDowell et al.

[11] Patent Number: 4,834,279

[45] Date of Patent: May 30, 1989

[54] GASKETING MATERIAL AND METHOD OF MAKING SAME BY DENSIFYING ADHESIVE BONDED FACING LAYERS TO A METALLIC CORE

[75] Inventors: Donald J. McDowell, Riverside; John A. Michna, Skokie, both of Ill.

[73] Assignee: Fel-Pro Incorporated, Skokie, Ill.

[21] Appl. No.: 80,888

[22] Filed: Aug. 3, 1987

[51] Int. Cl.⁴ .................. F16J 15/06; B29C 17/02; B23B 9/06

[52] U.S. Cl. .................. 277/235 B; 427/174; 428/450

[58] Field of Search ............... 277/227, 235 B; 428/450; 427/174

[56] References Cited

U.S. PATENT DOCUMENTS

| | | | |
|---|---|---|---|
| 3,897,576 | 7/1975 | Qualtrough et al. | 427/174 |
| 3,922,391 | 11/1975 | Qualtrough et al. | 427/174 |
| 4,376,539 | 3/1983 | Baldacci | 277/235 BX |
| 4,428,593 | 1/1984 | Pearlstein | 277/235 B |
| 4,478,887 | 10/1984 | Sommer et al. | 427/211 |
| 4,520,068 | 5/1985 | Sommer et al. | 428/324 |
| 4,529,653 | 7/1985 | Hargreaves et al. | 428/450 |
| 4,659,410 | 4/1987 | McDowell et al. | 277/235 BX |

*Primary Examiner*—Donald A. Griffin
*Attorney, Agent, or Firm*—Dressler, Goldsmith, Shore, Sutker & Milnamow, Ltd.

[57] ABSTRACT

This application discloses a method of producing gasketing material having an expansive solid metallic core and a densified facing covering a face of the core adhesively bonding a moderate density non-asbestos facing formed by a paper-making process to the core face and then, densifying the facing by compressing said facing in a series of at least 2 passes through compression rollers, thereby to densify said facing to a minimum of 80% of its ultimate density, while reducing the thickness of the facing to no more than 80% of its original thickness, all without significant distortion or destruction of said facing, and the gasketing material resulting from the practice of the method.

12 Claims, 1 Drawing Sheet

GASKETING MATERIAL AND METHOD OF MAKING SAME BY DENSIFYING ADHESIVE BONDED FACING LAYERS TO A METALLIC CORE

BACKGROUND OF THE INVENTION

This invention relates to an improved gasket and to a method of making same.

Gaskets, such as automotive head gaskets, are made in a variety of ways. Most frequently they comprise an expansive metallic core and a facing, usually one on each side of the core. The facing material is preferably highly compressed and is mechanically or chemically bonded to the core.

For many years typical preformed gasket facings have comprised asbestos-elastomer mixtures. Usually the facings were separately formed as sheets, which sheets were then laminated to metallic cores, such as tanged cores which mechanically bonded the facings to the core, or to solid cores, to which the facings were chemically bonded, as with suitable adhesives.

Because of the characteristics of asbestos fibers, it was possible to form facings asbestos-elastomer which were suitably dense and low in elastomer content and which, when greater density was required, could be compressed without adversely affecting the facings.

Other processes for forming gasketing material for producing gaskets with metal cores and facings were developed and are typified by the processes and products disclosed in patents such as U.S. Pat. Nos. 3,897,576, 3,922,391, 4,478,887 and 4,520,068. In these patents processes and products are described in which continuous metallic cores are provided, and a facing forming dough, or a facing forming soft material is applied to each side of the core, sometimes with an intermediate adhesive coating on the metallic core to promote securance of the core and facing forming material. The continuously formed gasketing material was then suitable for cutting into lengths, and forming into suitably configured and apertured gaskets, as by die-punching or the like. Some such doughs and soft materials incorporated asbestos fibers and others did not.

Preformed asbestos facings of the types described above were typically formed on paper-making equipment, and were later combined with metallic cores. Facings from doughs and soft materials and formed directly on metallic cores, as described in the patents just referred to, required expensive equipment, and failed to provide the economies and flexibility of manufacture available when facings formed on paper-making type equipment are made and used.

When gasket facings which omit asbestos fibers, and which incorporate primarily other fibers, such as Kevlar (a trademark of E. I. DuPont de Ne Mours) polyaramid fibers, fillers and the requisite relatively low quantities of elastomers or binders, are to be formed, it is frequently not possible to produce sufficiently densified facings, largely because facings of such compositions may not be suitably densified on paper making equipment. Further, after production, they have insufficient structural strength and integrity to permit densification, as via calendering rolls.

Thus, although non-asbestos facing materials are not only desirable, but today are frequently necessary for many gasketing uses, such as for automotive head gasket usage, such facings are frequently not readily usable for such purposes. As such, there remains a void in the art in terms of being able to use many facing materials which are formed of a desired family of ingredients, and which are desirably formed by paper-making processes, and in particular those which may then be effectively combined with non-perforated metallic cores to produce a gasket having suitably densified facings.

Thus, a principal object of the present invention is to provide a process whereby certain classes of facing materials, namely moderate density non-asbestos facing materials formed by a paper-making process may be joined with flat, non-perforated metallic cores, and which may be densified suitably, all without destroying or impairing the facings, and without producing significant waste.

SUMMARY OF THE INVENTION

In particular, the present invention contemplates a method of producing gasketing material and the improved gasketing material resulting from the practice of the method. Thus, in accordance with this invention there is provided a method of producing an improved gasketing material having an expansive solid metallic core providing a pair of expansive faces and a densified facing covering at least one expansive face of the core. The steps of the method comprise providing an expansive solid metallic core, providing an adhesive confronting a face of the solid metallic core, juxtaposing with the face a moderate density non-asbestos facing formed by a paper-making process, and with the adhesive therebetween, bonding said facing to the face, and then densifying the facing by compressing the facing in a series of passes through compression means, thereby to densify the facing to a minimum of 80% of its ultimate density, while reducing the thickness of the facing to no more than 80% of its original thickness, all without distortion or destruction of the facing.

In a preferred form of the method the compression step densifies the facing to between 80% and 90% of its ultimate density, which reduces the thickness of said facing to between 75% and no more than 80% of its original thickness.

The densifying may be by passing the bonded core and facings through calendering rollers in a series of at least 2 passes, and preferably at least 3 passes, thereby gradually to densify the facings without distortion or destruction of the facings. Preferably the non-asbestos facings are formed by a paper-making process from a slurry comprising by weight as active ingredients from 3% to 10% binder, from 12% to 18% non-asbestos fibers, and at least about 75% fillers. In the most preferred form the non-asbestos fibers are predominantly polyaramid fibers, and the density of the facing is at least about 75 pounds per cubic foot prior to bonding and densification, and is thereafter densified to at least 85% of its ultimate density.

The gasketing material of the present invention is that produced in accordance with the method of this invention.

Further objects, features and advantages will become apparent from the following description and drawings.

DESCRIPTION OF THE PRESENTLY PREFERRED EMBODIMENTS

Figure 1:
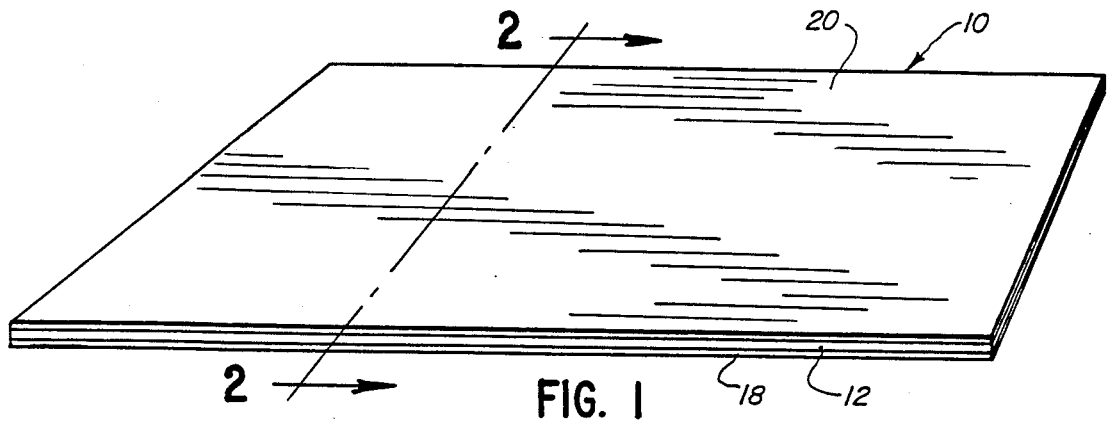
FIG. 1 is a perspective plan view of a sheet comprising a pair of facings chemically bonded to a metallic core, prior to densification.

Referring now to the drawings, a presently preferred embodiment of this invention is there illustrated.

Figure 2:
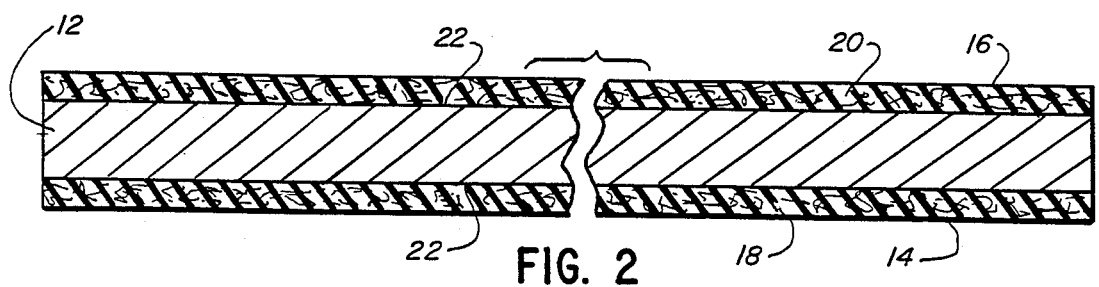
FIG. 2 is a cross-sectional view taken along line 2—2 of FIG. 1.

FIGS. 1 and 2 show a sheet of material 10 which has been chemically bonded, and which includes an expansive metallic core 12 having a pair of major expansive faces or surfaces 14, 16. Non-asbestos facings 18, 20 are bonded to the major surfaces via intermediate adhesive layers 22. The facing layers are formed on a paper-making machine and are of a moderate density.

Figure 3:
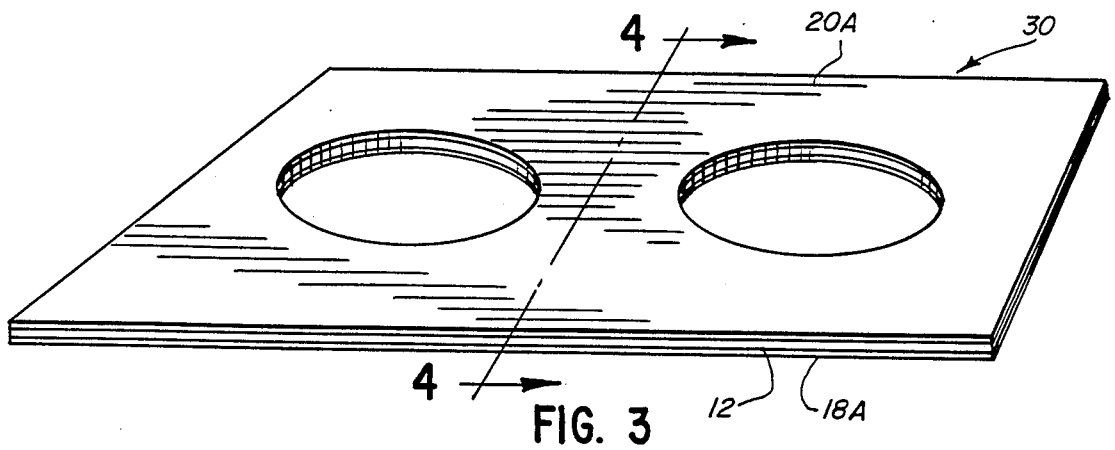
FIG. 3 is a perspective view of a schematic gasket formed from the sheet of FIG. 1 after densification.

FIG. 3 schematically shows a typical gasket, such as an automotive head gasket 30 which has been cut from a sheet, such as sheet 10, after it has been densified. Thus the facings 18A, 20A have been reduced in thickness by at least 20% of the original thickness as shown in FIGS. 1 and 2. The gasket 30 has been die-cut, or otherwise formed from the densified sheet, and may define a pair of combustion openings 32 which may be armored, and may define other openings, and suitable adjuncts, all as is well known in the art.

Figure 4:
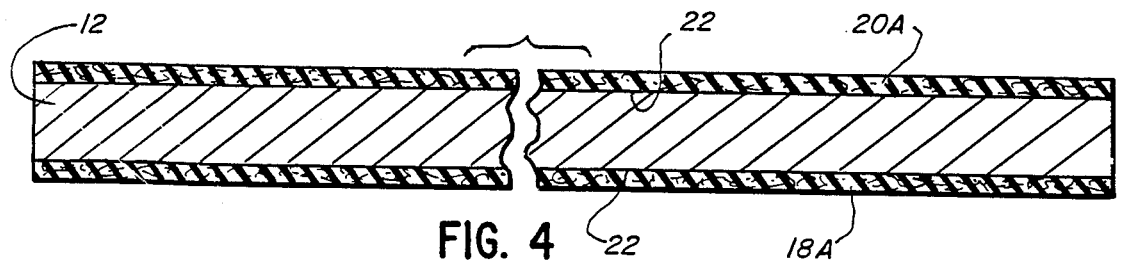
FIG. 4 is a cross-sectional view taken along line 4—4 of FIG. 3.

The process used to prepare the gasketing material of the gasket of FIG. 4 may be described by the following example. In one such example a sheet of gasketing material utilized a 0.010 inch black plate, low carbon steel expansive metallic core, and a pair of facings formed by a paper making process, each of the facings initially being about 0.030 inch thick and each having an initial density of about 79 pounds per cubic foot.

The facings were formed by a paper making process and comprised, by weight of solid materials:

15% Kevlar polyaramid pulp having short, highly fibrillated fibers, with less than 1% cellulose fibers mixed therewith;

5% Nitrile rubber binder; and

80% Fillers, namely clay fillers, predominantly silicates.

In the example, a phenolic-nitrile heat activatible adhesive was applied in very thin layers to each side of the expansive metallic core, i.e., to each major surface thereof. The facings were then juxtaposed with the major core surfaces, and the thusly formed assembly was passed through an induction heater which was heated to a temperature at which the adhesive softened. The heated assembly was then passed through combining rolls which pressed the facings into the softened adhesive. Very little densification (less than about ten percent) occurred at this time.

Although it might not be necessary in all cases, the assembly was allowed to cool for several minutes to make certain that the chemical, adhesive bond was secure. Because the process was a batch process, as distinguished from a continuous one, more cooling time was permissible.

Then the combined assembly was passed through compression means, in this instance the nip of a pair of calendering roll in a series of from 10 to 12 passes, thereby to densify the facings. The densities of the facings, as measured based on thickness changes, were increased to in excess of 110 to 115 pounds per cubic foot, namely to from about 116.6 to about 118.8 pounds per cubic feet, all without significant or visually discernable spreading, extrusion or delamination of the facings and without destruction of the leading edge. Thus the densities increased, based on the final densities, by about 32% to 34%, and based on an ultimate density of about 124 pounds per cubic inch, to about 90 to 95% of the ultimate densities of the facings.

The gasketing material thus produced was found to have characteristics essentially similar to those available in prior art asbestos containing facings made by available paper making processes, but without the damage to the facings which occured when attempts were otherwise made to densify them, than, for example, was possible when employing asbestos based facings made by paper making processes.

Thus, non-asbestos facings which are otherwise limited to moderate densities, such as papers having densities of from about 75 to 80 pounds per cubic feet, when facings made by available paper making processes, can now be used as effective gasketing materials and, when combined with metallic cores, may be used without sealing beads or other sealing adjuncts in severe environments, such as in the high pressure and high temperature environments which automotive head gaskets encounter. Furthermore, the moderate density facings failed to provide good torque retention. However, all of these deficiencies in moderate density, non-asbestos gasketing material made by paper making processes were overcome with the laminated and then densified gasketing material produced in accordance with the present invention.

Other facing material ingredients than those referred to in the example above are contemplated. For example other binders, such as styrene-butadiene binders polyacrylate binders and ABS binders may be used. They are preferably present in a relatively lower percentage of the final product, i.e., from about 3% to 10%, by weight, and desirably from about 4% to 8% by weight of the final facing. Other fibers, such as blends of Kevlar and cellulose fibers, and other inorganic fibers may be used, in part to be determined by the anticipated service temperature conditions for the gasket. The amount of fibers may vary, although about 12% to 18% by weight of the final facing seems to be the most preferred. Other fillers may be used as well to make up the principal remainder of the facing material by weight, i.e., at least about 75% by weight. Of course the core and facing thicknesses may vary.

The amount of compression (densification) of the formed facing which may have a density of from 60 to 95 pounds per cubic foot, and the densification as a percentage of the ultimate density of the final material will vary. It has been determined that the density to which the facings are densified should be at least 80%, preferably at least 85%, most preferably at least 90% of the ultimate density, and up to 95% of the ultimate density. The densification should comprise a minimum of a 20% reduction in thickness of the facing as produced on the paper making machine (i.e., to a densification of no more than 80% of the original facing thickness), desirably a 25% reduction in thickness (i.e., to a densification of no more than about 75% of the original facing thickness), and most preferably a reduction in thickness of up to 30% or more of the thickness of the original facing thickness as the facing was produced on the paper making machine.

Gaskets processed and made in accordance with the present invention have a number of advantages, especially as compared to those which might have been identically made, but for the chemical bonding of the facings to the core. Thus, the final gasketing material and gaskets cut therefrom have greater compressive, crush and extrusion resistance, and greater resistance to lateral flow in use. The gaskets display better torque retention. The scuff resistance, i.e., the resistance to peeling or delamination at the edges is far superior. Attempts to produce gasketing material without chemical bonding demonstrated that unbonded, densified gasketing material tends to display directionality, which may result from, and be induced by, extrusion of the facing material during the densification of the unbonded facings. Further, the repeated compression necessary to suitably densify the moderate density non-asbestos facing materials produced in accordance with the method of this invention does no discernible damage to the leading edge. When attempts were similarly made to densify a non-chemically bonded facing, this tended to destroy the lead-in edge and to produce waste. When gasketing material is made continuously, rather than as relatively shorter sheets, the densification of unbonded facings tends to produce a build-up of facing material at the nip. Of course, this makes continuous densification processing virtually impossible whereas a continuous formation process involving chemically bonded laminates of the present invention is clearly feasible.

It will be apparent to those skilled in the art from the forgoing description, that modifications may be made without departing from the spirit and scope of the present invention. Accordingly the invention is not intended to be limited except as may be made necessary in light of the appended claims.

What is claimed is:

1. A method of producing an improved scuff resistant gasketing material having an expansive originally solid metallic core providing a pair of expansive faces and a densified facing covering at least one expansive face of the core comprising the steps of:

providing an expansive solid metallic core, providing a thin layer of a heat activatable adhesive confronting a face of said solid metallic core, juxtaposing a preformed moderate density non-asbestos facing formed by a paper-making process with said core face and with the adhesive therebetween, chemically bonding said facing to said face by passing said facing and said core through an induction heater to soften said adhesive and activate same and then passing said facing and said core through combining rolls to lightly press said facing into said softened adhesive and slightly compress said facing, and then, densifying said facing by compressing said facing in a series of at least 2 passes through compression means, thereby to densify said facing to a minimum of 80% of its ultimate density, while reducing the thickness of said facing to no more than 80% of its original thickness to impart said scuff resistance, all without distortion or destruction of said facing.

2. The method of claim 1, and wherein said densifying by compressing said facing densifies the facing to between 80% and 95% of its ultimate density, while reducing the thickness of said facing to between 75% and no more than 80% of its original thickness.

3. The method of clam 1, and wherein the densifying is by passing the bonded core and facing through calendaring rollers in a series of at least 3 passes, thereby gradually to densify the facing without distortion or destruction of the facing.

4. The method of claim 1, and wherein said facing comprises a non-asbestos facing formed by a papermaking process from a slurry comprising as active ingredients:

from 3% to 10% by weight binder, from 12% to 18% by weight non-asbestos fibers, and at least about 75% fillers.

5. The method of claim 4, and wherein said facing formed is of a density of from about 60 to about 95 pounds per cubic foot.

6. The method of claim 4, and wherein said non-asbestos fibers are predominantly polyaramid fibers, and wherein the density of said facing is at least about 75 pounds per cubic foot prior to bonding and densification.

7. The method of claim 6, and wherein said facing is densified to at least 85% of its ultimate density.

8. Improved scuff resistant gasketing material having an expansive originally solid metallic core providing a pair of expansive faces and a densified facing covering at least one expansive face of the core chemically adhesively bonded to the core by a heat softenable heat activatable adhesive, the facing originally being of a moderate density non-asbestos facing formed by a paper-making process, and the formed facing after being bonded to said core face being densified in situ by compressing the facing in a series of at least 2 passes through compression means, thereby providing a densified facing having a minimum of 80% of its ultimate density and a thickness of no more than 80% of its original as bonded thickness and imparting scuff resistance, all without significant distortion, extrusion, delamination or destruction of the facing.

9. The gasketing material of claim 8, and wherein said facing is densified to between 80% and 95% of its ultimate density and its thickness is reduced to between 75% and no more than 80% of its original thickness.

10. The gasketing material of claim 8, and wherein said facing is a non-asbestos facing formed by a paper-making process from a slurry comprising as active ingredients:

from 3% to 10% by weight binder, from 12% to 18% by weight non-asbestos fibers, and at least about 75% fillers.

11. The gasketing material of claim 10, and wherein said non-asbestos fibers are predominantly polyaramid fibers, and wherein the density of the facing is at least about 75 pounds per cubic foot prior to bonding and densification.

12. The gasketing material of claim 11, and wherein said densified facing is densified to at least 85% of its ultimate density.

* * * * *